Nov. 6, 1945.  A. CARGILL  2,388,307
AIR PROPELLED VEHICLE
Filed Jan. 6, 1943  4 Sheets-Sheet 2
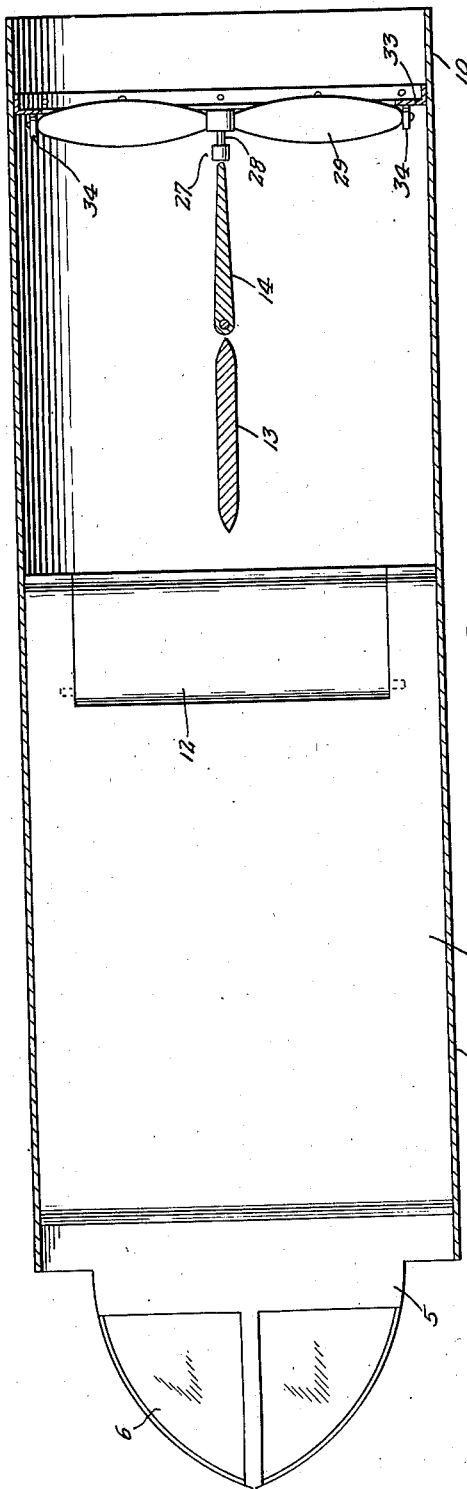
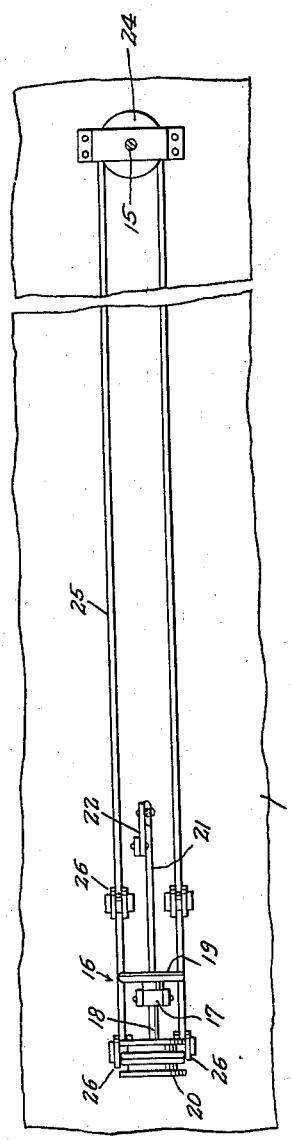
Inventor
Alexander Cargill
By Clarence A. O'Brien
and Harvey B. Jacobson
Attorneys Nov. 6, 1945. A. CARGILL 2,388,307
AIR PROPELLED VEHICLE
Filed Jan. 6, 1943 4 Sheets-Sheet 3

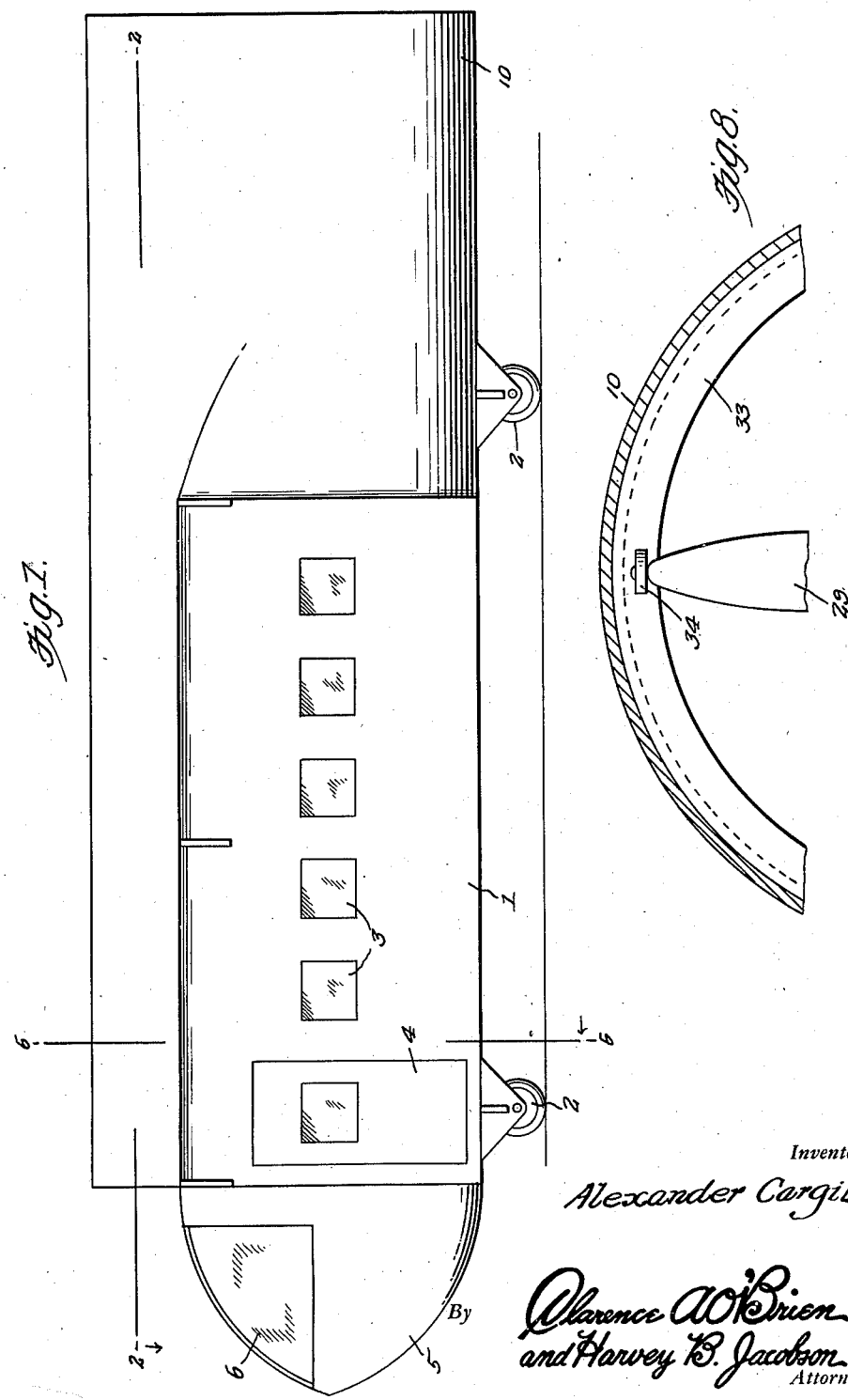

Inventor
Alexander Cargill

By Clarence A. O'Brien
and Harvey B. Jacobson
Attorneys

Nov. 6, 1945.   A. CARGILL   2,388,307
AIR PROPELLED VEHICLE
Filed Jan. 6, 1943   4 Sheets-Sheet 4
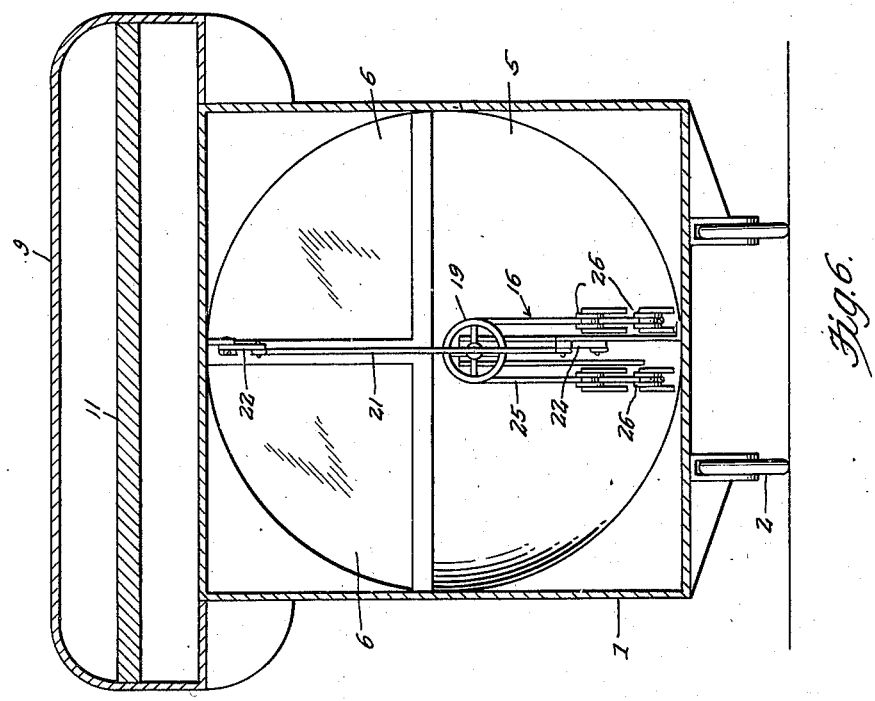
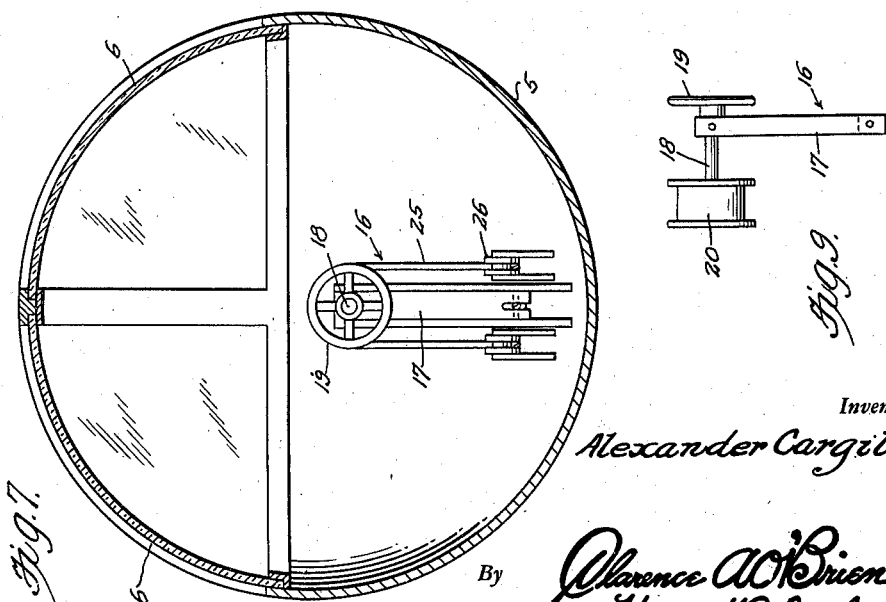
Inventor
Alexander Cargill
By Clarence A. O'Brien
and Harvey B. Jacobson
Attorneys Patented Nov. 6, 1945

2,388,307

UNITED STATES PATENT OFFICE 2,388,307

AIR PROPELLED VEHICLE

Alexander Cargill, West Palm Beach, Fla.

Application January 6, 1943, Serial No. 471,487

2 Claims. (Cl. 180—1)

The present invention relates to new and useful improvements in air propelled vehicles, and has for its primary object to provide, in a manner as hereinafter set forth, a vehicle of this character comprising a novel construction and arrangement of parts.

Another very important object of the invention is to provide a vehicle of the aforementioned character which embodies a unique arrangement of control surfaces and propulsion means.

Other objects of the invention are to provide a vehicle of the character described which will be comparatively simple in construction, strong, durable, safe and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a vehicle constructed in accordance with the present invention.

Figure 2 is a view in horizontal section through the upper portion of the vehicle, taken substantially on the line 2—2 of Figure 1.

Figure 5 is a fragmentary view in horizontal section, taken substantially on the line 5—5 of Figure 3.

Figure 6 is a cross sectional view, taken substantially on the line 6—6 of Figure 1.

Figure 7 is a cross sectional view through the nose, taken substantially on the line 7—7 of Figure 3.

Figure 8 is a fragmentary view in cross section, taken substantially on the line 8—8 of Figure 3.

Figure 9 is a view in side elevation of the control operating means.

Figure 3:
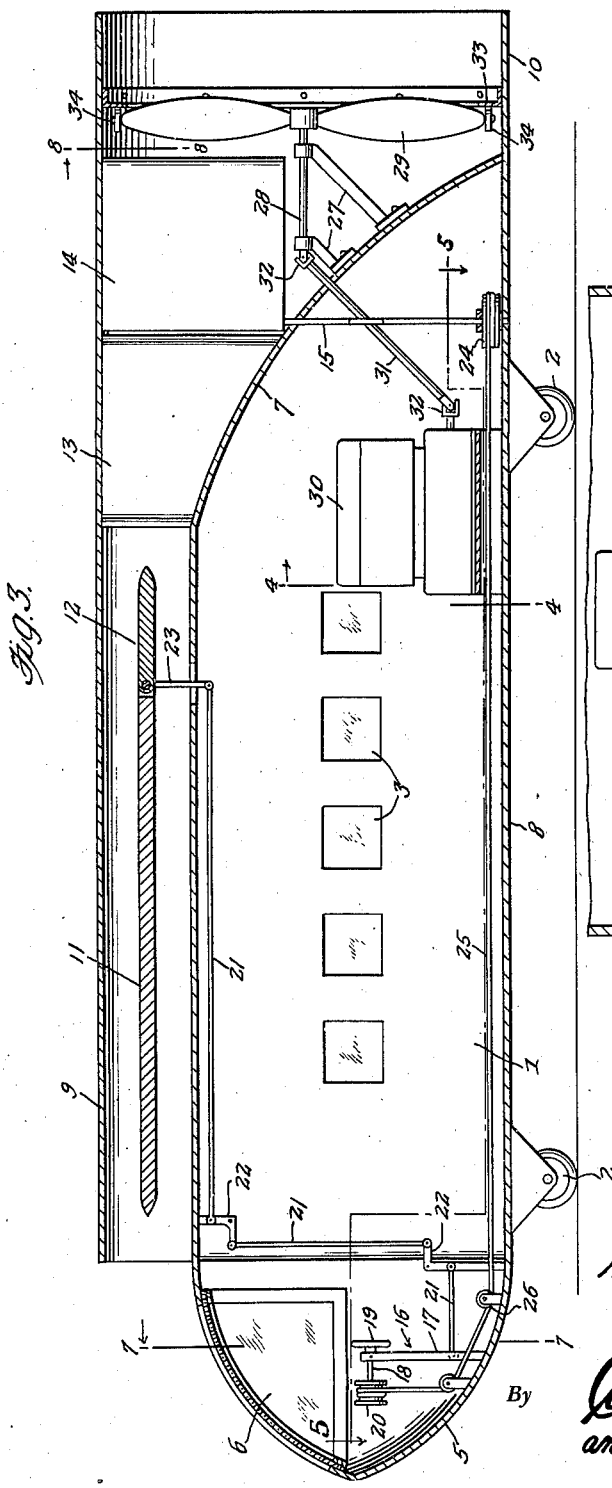
Figure 3 is a view in vertical longitudinal section through the vehicle.
Figure 4:
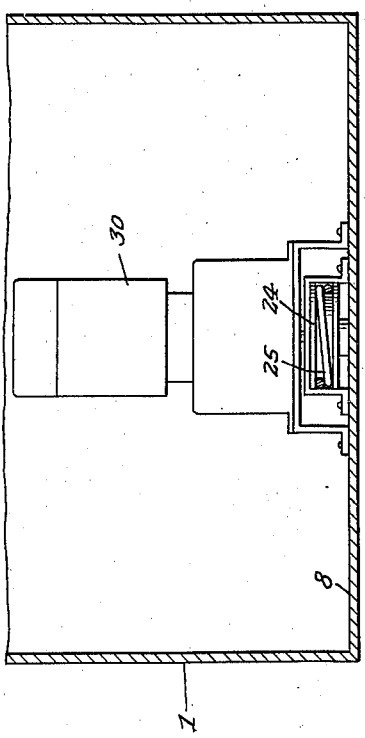
Figure 4 is a cross sectional view through the lower portion of the vehicle, taken substantially on the line 4—4 of Figure 3.

Referring now to the drawings in detail, it will be seen that the embodiment of the invention which has been illustrated comprises a body or fuselage 1 of suitable dimensions, said fuselage being substantially square in cross section. Supporting wheels 2 are mounted beneath the front and rear portions of the fuselage 1. Windows 3 and a door 4 are provided in the fuselage 1. The fuselage 1 terminates, at its forward end, in a substantially bullet-shaped nose 5 having windows 6 therein. At its rear end, the fuselage 1 terminates in a curved, inclined back 7 which extends rearwardly and downwardly to the floor 8 of said fuselage.

Mounted longitudinally on top of the fuselage 1 is a substantially flat wind tunnel 9 the sides of which project beyond the side walls of said fuselage, as illustrated to advantage in Figure 6 of the drawings. The substantially flat wind tunnel 9 merges into a tubular rear end portion 10 of circular cross section which extends downwardly to the horizontal plane of the floor 8 rearwardly of the back 7 of the fuselage 1.

Mounted horizontally in the wind tunnel 9 and spaced from the top and bottom thereof is a partition 11. The rear end portion of the partition 11 is recessed to accommodate a horizontal air current controlling plane 12. Rearwardly of the plane 12 is a vertical stabilizing fin 13 in the wind tunnel 9. A vertical plane 14 is provided rearwardly of the stabilizing fin 13. The plane 14 is fixed on a vertical shaft 15 which extends downwardly into the fuselage 1 through the back 7 thereof. A control unit 16 is provided in the forward portion of the fuselage 1 for actuating the plane 12 and plane 14. Toward this end, the control unit 16 includes a stick 17 which is mounted for forward and rearward swinging movement, said stick having journaled thereon a shaft 18. A hand wheel 19 is fixed on one end portion of the shaft 18. A pulley 20 is fixed on the other end portion of the shaft 18. The plane 12 is operatively connected to the stick 17 by means including rods 21, bell crank levers 22, an arm 23, et cetera. A pulley 24 is fixed on the lower end portion of the shaft 15. An endless belt or cable 25 is trained around the pulleys 20 and 24 for connecting the shaft 15 to the shaft 18 for actuation thereby. Suitable guide pulleys 26 are provided for the endless belt or cable 25.

Rigidly mounted on the back 7 of the fuselage 1 is a pair of supports 27. Rotatably mounted on the supports 27 is a longitudinal shafts 28. A screw propeller 29 is fixed on the rear end portion of the shaft 28. The shaft 28 is connected to a power plant 30 in the fuselage 1 by means including a shaft 31 and universal joints 32.

It will be observed that the propeller 29 is operable in the circular rear end portion 10 of the wind tunnel 9. Mounted in the circular portion 10 of the wind tunnel 9 is an annular guide or track 33. Rollers 34 are mounted on the free ends of the blades of the propeller 29 and travel on the annular track 33.

It is thought that the operation of the vehicle will be readily apparent from a consideration of the foregoing. Briefly, the propeller 29 draws air into the wind tunnel 9 at the forward end thereof and expels said air at the rear end of said wind tunnel, thus causing the craft to move forwardly. Operation of the plane 12 through the medium of the stick 17 causes variable restriction of the air passing through the tunnel. Of course, the plane 14 controls the direction of movement in a horizontal plane, said plane being operable by the hand wheel 19.

It is believed that the many advantages of a vehicle constructed in accordance with the present invention will be readily understood, and although a preferred embodiment of the vehicle is as illustrated and described, it is to be understood that changes in the details of construction and in the combination and arrangement of parts may be resorted to which will fall within the scope of the invention as claimed.

What is claimed is:

1. An air propelled vehicle of the character described comprising a fuselage including a rearwardly inclined back extending to the bottom of said fuselage, supporting wheels for the fuselage, a substantially flat wind tunnel mounted longitudinally of and on top of the fuselage, said wind tunnel including a rear end portion of circular cross section positioned rearwardly of the fuselage, a vertical plane operable in said rear end portion of the wind tunnel, a screw propeller operable in the tunnel rearwardly of the vertical plane, a power plant mounted in the rear of said fuselage, means operatively connecting said power plant to the propeller, a horizontal partition mounted in the tunnel forwardly of the vertical plane, a horizontal air current controlling plane mounted on said partition, and common means in the fuselage for actuating the planes.

2. An air propelled vehicle of the character described comprising a fuselage, said fuselage being substantially square in cross section and including a curved, inclined back extending downwardly to the bottom of the fuselage, supporting wheels for the fuselage, a substantially flat wind tunnel mounted longitudinally of and on top of the fuselage, said substantially flat tunnel merging into a rear end portion of circular cross section extending rearwardly from the fuselage, a vertical shaft in said rear end portion of the tunnel extending downwardly into the fuselage through the back thereof, a vertical plane fixed on said shaft and operable in the tunnel, a stabilizing fin in the tunnel forwardly of the vertical plane, a screw propeller operable in the tunnel rearwardly of the vertical plane, a horizontal partition mounted in the tunnel forwardly of the stabilizing fin and spaced from the top and bottom of said tunnel, a horizontal air current controlling plane mounted on the rear end of said partition, and common means in the fuselage for actuating the planes.

ALEXANDER CARGILL.